United States Patent
Kim

(10) Patent No.: US 10,197,988 B2
(45) Date of Patent: Feb. 5, 2019

(54) APPARATUS AND METHOD FOR AUTOMATICALLY DETECTING AND COMPENSATING FOR A BACKLASH OF A MACHINE TOOL

(75) Inventor: Ki Hong Kim, Gyeongsangnam-Do (KR)

(73) Assignee: Doosan Machine Tools Co., Ltd., Gyeongsangnam-do (KR)

(*) Notice: Subject to any disclaimer, the term of this patent is extended or adjusted under 35 U.S.C. 154(b) by 914 days.

(21) Appl. No.: 14/009,698

(22) PCT Filed: May 9, 2012

(86) PCT No.: PCT/KR2012/003635
§ 371 (c)(1),
(2), (4) Date: Oct. 3, 2013

(87) PCT Pub. No.: WO2012/157885
PCT Pub. Date: Nov. 22, 2012

(65) Prior Publication Data
US 2014/0039666 A1    Feb. 6, 2014

(30) Foreign Application Priority Data

May 13, 2011 (KR) .................. 10-2011-0045290

(51) Int. Cl.
*G05B 19/404* (2006.01)
*B23Q 5/56* (2006.01)
(Continued)

(52) U.S. Cl.
CPC ............. *G05B 19/404* (2013.01); *B23Q 5/56* (2013.01); *B23Q 5/40* (2013.01); *F16H 25/2003* (2013.01);
(Continued)

(58) Field of Classification Search
None
See application file for complete search history.

(56) References Cited

U.S. PATENT DOCUMENTS 4,916,375 A    4/1990    Kurakake et al.
5,059,881 A    10/1991   Fujita et al.
(Continued)

FOREIGN PATENT DOCUMENTS

EP    1288751 A2    3/2003
JP    01-274947    11/1989
(Continued)

OTHER PUBLICATIONS https://en.wikipedia.org/wiki/Servomotor, p. 2, section 3.*
(Continued)

*Primary Examiner* — Mohammad Ali
*Assistant Examiner* — Bernard G Lindsay
(74) *Attorney, Agent, or Firm* — John D. Veldhuis-Kroeze; Westman, Champlin & Koehler, P.A.

(57) ABSTRACT

According to an embodiment of the present invention, a torque variation of a servomotor, which is measured in a numerical control apparatus of an existing numerical control machine tool, is observed, and a backlash is detected by calculating a transfer distance of an output shaft of the servomotor at a torque peak, without adding additional positioning detection equipment, thereby detecting an accurate backlash amount without adding additional equipment.

5 Claims, 6 Drawing Sheets

(51) Int. Cl.
  *F16H 25/20* (2006.01)
  *F16H 57/12* (2006.01)
  *B23Q 5/40* (2006.01)

(52) U.S. Cl.
  CPC .............. *F16H 2057/123* (2013.01); *G05B 2219/41032* (2013.01)

(56) References Cited

U.S. PATENT DOCUMENTS

| | | | |
|---|---|---|---|
| 5,767,645 A | 6/1998 | Park | |
| 5,920,169 A * | 7/1999 | Hamamura | G05B 19/404 318/561 |
| 6,060,854 A * | 5/2000 | Yutkowitz | G05B 19/404 318/574 |
| 2001/0005800 A1* | 6/2001 | Shiba | G05B 19/404 700/193 |
| 2004/0002778 A1* | 1/2004 | Giamona | G05B 19/4141 700/61 |
| 2005/0137739 A1 | 6/2005 | Yoshida et al. | |
| 2008/0203959 A1* | 8/2008 | Norihisa | H02P 23/18 318/630 |
| 2009/0062950 A1* | 3/2009 | Chen | G05B 19/41875 700/95 |
| 2011/0181046 A1* | 7/2011 | Garshelis | G01L 3/102 290/50 |

FOREIGN PATENT DOCUMENTS

| | | |
|---|---|---|
| JP | 02-015311 | 1/1990 |
| JP | 4503148 B2 | 1/2002 |
| JP | 4137386 | 8/2008 |
| KR | 10-0241148 | 3/2000 |

OTHER PUBLICATIONS

Bagad, 'Mechatronics', Technical Publications Pune, 2008.*
Chinese Office Action dated May 11, 2015 for Chinese Application No. 201280018416.5, 7 pages.
European Search Report dated Jun. 22, 2016 for European Application No. 12785621.9, 7 pages.
Search Report dated Nov. 29, 2012 and written in Korean with English translation attached for International Patent Application No. PCT/KR2012/003635 filed May 9, 2012, 5 pages.

* cited by examiner

APPARATUS AND METHOD FOR AUTOMATICALLY DETECTING AND COMPENSATING FOR A BACKLASH OF A MACHINE TOOL

CROSS-REFERENCE TO RELATED APPLICATION

This application is a Section 371 National Stage Application of International Application No. PCT/KR2012/003635, filed May 9, 2012 and published, not in English, as WO2012/157885 on Nov. 22, 2012.

FIELD OF THE DISCLOSURE

The present disclosure relates to a method and an apparatus for automatically detecting and compensating for a backlash in a machine tool, and particularly, to a method and an apparatus for automatically detecting and compensating for a backlash due to lost motion occurring when a motor of a numerical control (NC) machine tool is reversed.

BACKGROUND OF THE DISCLOSURE

A transfer system in a numerical control (NC) machine tool converts rotating force from a servomotor or other rotation driving sources into linear motion by means of a power transmission mechanism including a rack and a pinion, a ground ball-nut lead screw, or the like, and moves a work table for fixing a workpiece, tools for processing a workpiece, or the like to a predetermined position. Recently, in order to process a three-dimensional free surface of a workpiece, a numerical control (NC) machine tool equipped with a plurality of control shafts including five shafts is used.

In general, a decelerator, a ball screw, and the like, which are used in the numerical control machine tool, have a structure for removing a mechanical backlash by applying a pre-load, but when the motor is reversed in order to transfer the workpiece in the opposite direction after the workpiece is processed while being transferred in one direction, a phenomenon occurs in which the workpiece may not be immediately transferred in the opposite direction but slightly delayed. Because there is a problem in that processing precision deteriorates due to a backlash according to lost motion occurring when the motor is reversed, as described above, it is necessary to correct the backlash.

The backlash according to the lost motion occurs by a wound up or twisted phenomenon of a ball screw and a coupling due to a mutual relationship between stiffness and frictional force of the transfer system, rather than by mechanical hysteresis between a decelerator or a ball screw and a nut. That is, when the motor is reversed, the lost motion occurs due to a phenomenon that the workpiece does not immediately reach the instructed position, but only the ball screw and the coupling are wound up or twisted. The lost motion is increased as frictional force, which occurs by a relative motion with respect to a guide surface in the transfer system of the machine tool, and frictional force at the ball-nut lead screw become larger, and tends to be increased as the workpiece is positioned at a position far from the motor.

In recent years, the pre-load of the ball screw-nut is increased in some cases in order to raise the stiffness of a rotating shaft of the transfer system in a situation in which higher precision and stiffness of the machine tool is required, and in this case, the lost motion is inevitably increased due to the friction, and the wound up or twisted phenomenon because of the increased pre-load.

In order to solve the problem, in some cases, a manufacturer producing the machine tool provides a user with equipment in a state in which a backlash of the equipment is measured in a non-load state and the measured backlash is stored in a numerical control (NC) parameter, but in this case, there is a problem in that the backlash is varied as a usage condition of the delivered equipment is varied such that a correction thereof is not accurately performed. That is, there is a problem in that when a backlash amount is changed due to an influence caused by a change in a weight and a lubrication condition of the workpiece, a coefficient of friction of the transfer table of the transfer system, and the like, the user may not appropriately cope with the change in the backlash amount. Therefore, the user adjusted the change in the backlash by measuring the backlash again and correcting a correction value whenever the backlash is changed as a usage environment of the equipment is changed, which is very inconvenient.

Recently, a method of correcting the backlash is performed by measuring in advance the backlash of the workpiece for each weight, recording the measured backlash in the form of a look-up table in a non-volatile memory region of the numerical control (NC) apparatus, and allowing the user to input a corresponding processing code (for example, M code) after estimating a weight of the workpiece. However, in general, because the backlash of the equipment is not changed only by the weight of the workpiece, but other various variables affects the backlash, and there may be large deviations between equipment even though the workpieces having the same weight are used, there is an inconvenience in that the backlash of the workpiece for each weight needs to be measured and managed for each equipment. In addition, although the same equipment is used, the user may not appropriately adjust the problem when a backlash is changed while the usage environment of the equipment is changed.

To solve the above problem, a linear scale may be used as a manner of controlling a position by feeding back a position signal from a positioning detection device to a servomotor. The linear scale is a type of full-closed feedback system, and has high precision because the linear scale may directly detect the position. However, because the linear scale or the like requires an additional positioning detection device, there is a problem in that the linear motor or the like causes an increase in costs of the machine tool.

A method of indirectly controlling a position of a work table or an object to be position-controlled may be used by installing a rotation position detector such as a resolve or an optical rotary encoder in the servomotor, and feeding back an amount of rotation detected from the rotation position detector to the servomotor, thereby controlling the amount of rotation of the servomotor. The rotary encoder method is a type of semi-closed feedback system, and has a merit in that an additional positioning detection device is not required, but there is a problem in that it is difficult to perform an accurate position control with respect to the transfer table on which the workpiece is fixed.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An embodiment of the present disclosure has been made in an effort to solve the problem of the related art, and an object of the present disclosure is to automatically detect and correct a backlash according to lost motion when the motor is reversed. That is, the backlash according to the lost motion when the motor is reversed is automatically detected and corrected without adding additional positioning detection equipment to the existing numerical control machine tool, thereby improving processing precision and convenience without greatly raising costs of the entire machine tool.

An embodiment of the present disclosure solves the problem of the related art by simply adding a backlash detection function to the numerical control (NC) apparatus of the existing numerical control (NC) machine tool without adding additional positioning detection equipment.

According to a method of detecting a backlash which occurs by reversing a motor of a transfer system of a numerical control (NC) machine tool according to an embodiment of the present disclosure, functions are added which stepping-transfers an output shaft of a servomotor from when the motor is reversed, measures and records torque of the servomotor at each position where the output shaft is stepping-transferred, detects a torque peak by comparing an absolute value of torque at each position where the output shaft is stepping-transferred with an absolute value of torque at a previous position, and determines a backlash value based on the stepping-transferred distance at the detected torque peak, thereby automatically detecting the backlash without additional positioning detection equipment. The backlash value is the stepping-transferred distance at the torque peak.

Preferably, before the output shaft is stepping-transferred, the backlash correction function of the numerical control (NC) apparatus of the machine tool is turned off so as to reduce a measurement error of the backlash. Preferably, the automatic backlash detection is performed after transferring a transfer table of the transfer system to a reference position.

Preferably, the backlash correction function of the numerical control (NC) apparatus of the machine tool is automatically turned on again after determining the backlash value. Here, the backlash value detected according to the present disclosure may be automatically inputted to a correction parameter of the numerical control (NC) apparatus of the machine tool, thereby correcting the backlash. A user may directly input the detected backlash value to the correction parameter.

Preferably, the backlash value is detected in one direction, and then the backlash value is detected once more in the opposite direction thereof such that an average value thereof is used as the correction parameter.

In order to perform the backlash detection function for detecting the backlash which occurs by reversing the motor, the numerical control (NC) apparatus according to an embodiment of the present disclosure is programmed to stepping-transfer the output shaft of the servomotor, includes a memory buffer for recording the torque of the servomotor at each position where the output shaft is stepping-transferred, is programmed to detect the torque peak by comparing an absolute value of the recorded torque at each position where the output shaft is stepping-transferred with an absolute value of the recorded torque at the previous position, and determines the backlash value with the stepping-transferred distance at the torque peak.

Preferably, the numerical control (NC) apparatus includes a correction parameter storage unit for storing a backlash correction parameter, and is programmed to record the determined backlash value in the correction parameter storage unit.

Preferably, the numerical control (NC) apparatus is programmed to detect the backlash value in one direction, and then detects once more the backlash value in the opposite direction thereof, so as to use an average value thereof as the correction parameter.

Preferably, regarding the automatic backlash detection function, the numerical control (NC) apparatus includes a numerical control (NC) screen for an interface with the user.

The numerical control (NC) machine tool according to the present disclosure includes the numerical control (NC) apparatus that performs the aforementioned method.

According to an embodiment of the present disclosure, the backlash according to the lost motion when the motor is reversed is automatically detected and corrected without adding additional positioning detection equipment to the existing numerical control machine tool, thereby greatly improving processing precision and convenience without greatly raising costs of the entire machine tool.

DESCRIPTION OF MAIN REFERENCE NUMERALS OF DRAWINGS

Figure 1:
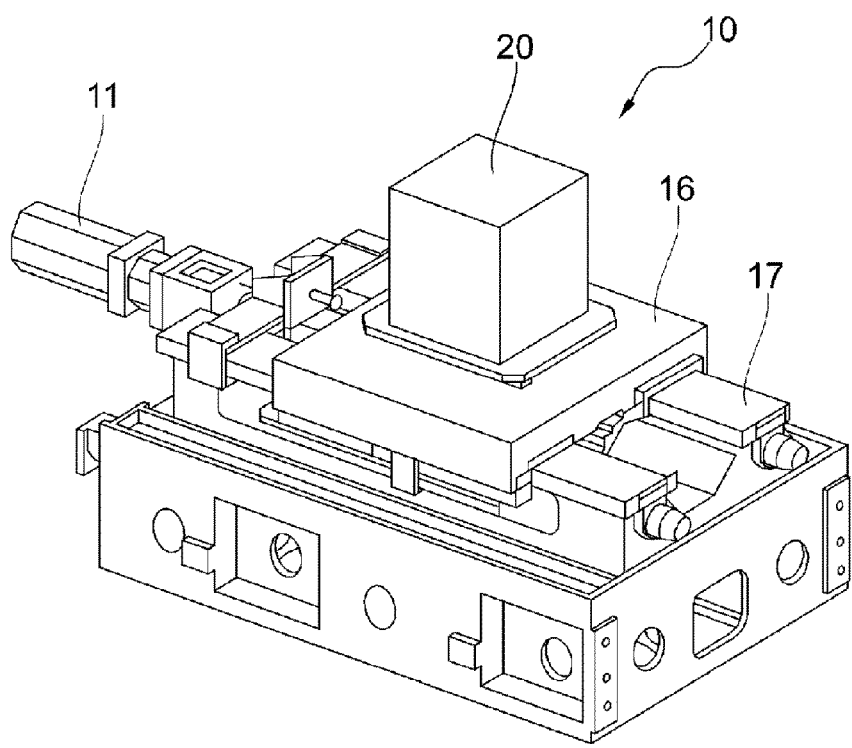
FIG. 1 is a perspective view of a transfer system of a machine tool.

10: Transfer system
11: Servomotor
12: Coupling
13: Rotating shaft
14: Bearing
15: Power transmission unit
16: Transfer table
17: Guide unit
20: Workpiece
30: Memory buffer
40: Screen of numerical control (NC) apparatus

DETAILED DESCRIPTION

Figure 2:
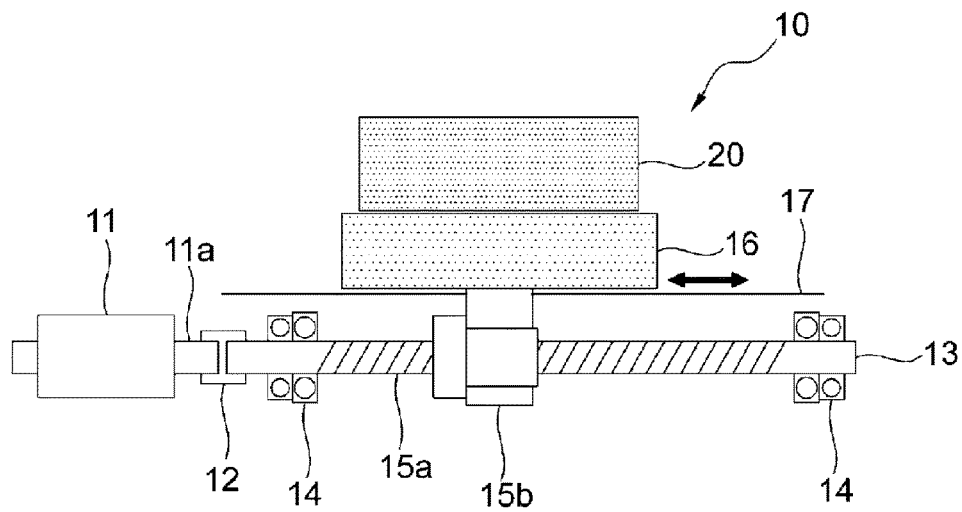
FIG. 2 is a block diagram of the transfer system of the machine tool.

FIG. 1 is a perspective view of a transfer system 10 of a machine tool, and FIG. 2 is a block diagram of the transfer system 10 of the machine tool. In the transfer system 10, an output shaft 11a of a servomotor 11 is connected to a rotating shaft 13 through a coupling 12, and the rotating shaft 13 is rotated when the servomotor 11 is operated. The rotating shaft 13 is rotatably supported by bearings 14. In order to convert rotational motion of the rotating shaft 13 into linear motion, a power transmission unit 15 is disposed. For example, as illustrated in FIG. 2, the power transmission unit 15 includes a ball screw 15a and a nut 15b, and when the rotating shaft 13 is rotated, the ball screw 15a is rotated, and thereby the nut 15b, which is engaged with the ball screw 15a, is linearly moved forward and rearward along the rotating shaft 13.

A transfer table 16 is fixed on the nut 15b of the power transmission unit 15 such that the table 16 is also linearly moved together with the nut 15b when the nut 15b is linearly moved along the rotating shaft 13. The transfer table 16 is preferably guided by a guide unit 17. For example, as illustrated in FIG. 1, the guide unit 17 may include guide rails in two rows.

When work is performed, a workpiece 20 is placed on the transfer table 16 of the transfer system 10 of the machine tool, and then the workpiece 20 is processed while the transfer table 16 and the workpiece 20 are moved by an operation of the servomotor 11.

In a state in which the workpiece 20 is placed on the transfer table 16, when the servomotor 11 is reversed in order to transfer the workpiece 20 in the opposite direction after the workpiece 20 is processed while being transferred in one direction, a phenomenon occurs in which the transfer table 16 and the workpiece 20 may not be immediately transferred in the opposite direction but slightly delayed. This lost motion is caused by a phenomenon in which the ball screw 15a, the coupling 12, and the like are wound up or twisted due to a mutual relationship or the like between stiffness and internal frictional force of the transfer system 10. That is, when a command instructing the servomotor 11 to be reversed in the opposite direction (second direction) is received when the workpiece is stopped after being transferred in a first direction, a wound up or twisted state of the ball screw 15a and the coupling 12 in the direction is released, and then a wound up or twist state thereof in the second direction is formed, and when torque of the servomotor 11 is increased so as to overcome frictional force, the transfer in the second direction eventually starts.

Figure 3:
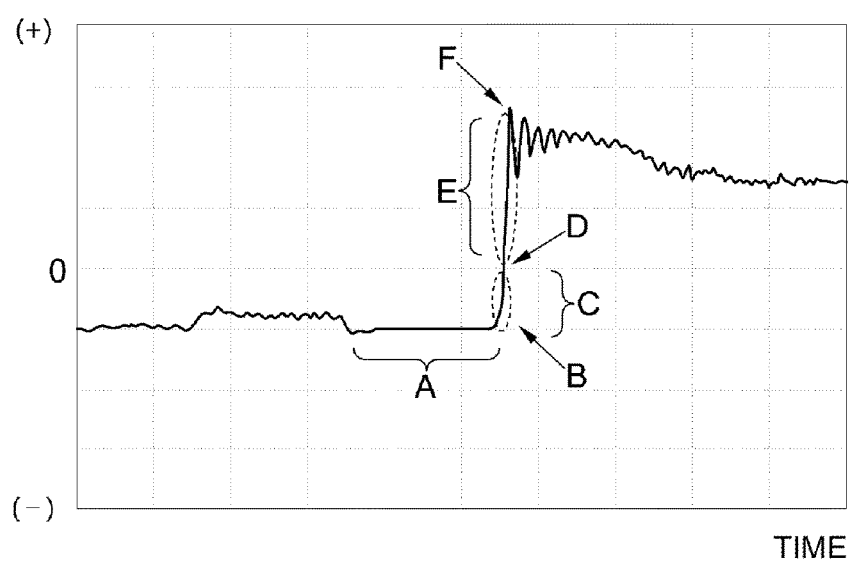
FIG. 3 is a graph of a torque variation according to time when a motor is reversed.

A variation in torque of the servomotor 11 occurring when the servomotor 11 is reversed in the second direction after transferring the workpiece in the first direction is illustrated in FIG. 3. In FIG. 3, a section A refers to a section where the workpiece is stopped after being transferred in the first direction. It may be confirmed that torque of the servomotor 11 is not zero in the section A where the servomotor 11 is stopped, and the reason is that a state in which the ball screw 15a and the coupling 12 are wound up or twisted is maintained by frictional force while the workpiece is transferred in the first direction. A point B refers to a point where the servomotor 11 is reversed from the first direction to the opposite direction (second direction) after receiving the command instructing the servomotor 11 to be reversed. A section C refers to a section where the wound up or twisted state of the ball screw 15a and the coupling 12 is released by reversing the servomotor 11. A point D refers to a point where the wound up or twisted state of the ball screw 15a and the coupling 12 is completely released such that torque of the servomotor 11 becomes zero. A section E refers to a section where the ball screw 15a and the coupling 12 are wound up or twisted in the opposite direction (second direction) such that torque of the servomotor 11 is continuously increased. When reaching a point F, the point F refers to a point where torque of the servomotor 11 completely overcomes frictional force inside the transfer system such that the transfer in the second direction starts. It can be seen that when the transfer starts in the second direction at the point F, torque of the servomotor 11 is no longer increased but decreased. That is, at the point F, torque of the servomotor 11 is placed at the peak.

Therefore, a distance that the servomotor 11 is moved in the section C and the section E from the point B where the servomotor 11 starts to be reversed, to the point F where the transfer in the second direction starts, becomes a backlash amount by the lost motion.

As such, the present disclosure has been made to obtain a method of calculating a backlash amount by using torque variation data of the servomotor 11 in consideration of the aspect in which a variation in torque of the servomotor 11 occurs at a point where the transfer in the second direction starts after the servomotor 11 is reversed as described above. Because the torque variation of the servomotor 11 is recorded in servo data of the numerical control (NC) machine tool, the present disclosure has a merit in that the backlash may be calculated by using only the existing equipment without adding a separate positioning detection device.

In order to catch a point where the transfer in the second direction starts after the servomotor 11 is reversed in accordance with the present disclosure, a peak of torque needs to be caught from the servo data after the servomotor 11 is reversed. To this end, preferably, after reversing the motor, an absolute value of torque data of the servomotor 11 is periodically stored in a first-in first-out buffer (FIFO buffer) inside the numerical control (NC) apparatus, an increase or decrease pattern of the stored torque data is observed, and whether the stored torque data reaches a peak of the torque data is inspected. The reason why the absolute value of torque is used is to detect the torque peak with the same algorithm even when the torque data is not only positive but also negative.

In order to measure the backlash amount, position data of the servomotor 11 need to be monitored after reversing the motor, and in general, the backlash amount is from several micrometers (µm) to tens of micrometers (µm) in unit, and a work period in which the numerical control (NC) apparatus is able to be programmed is from several milliseconds (msec) to tens of milliseconds (msec). Therefore, in a case in which the servomotor 11 is driven at a usual speed, it is difficult to measure an accurate transfer distance. In order to resolve the above problem, it is possible to use a method of monitoring the position data and the torque data of the servomotor 11 while transferring the servomotor 11 at an extremely slow speed in order to obtain the transfer distance of the servomotor 11 after reversing the motor, or a method of monitoring periodical torque data while driving the output shaft 11a of the servomotor 11 to be stepping-transferred, for example, by 1 µm after reversing the motor, and while counting stepping transfer distance.

Figure 4:
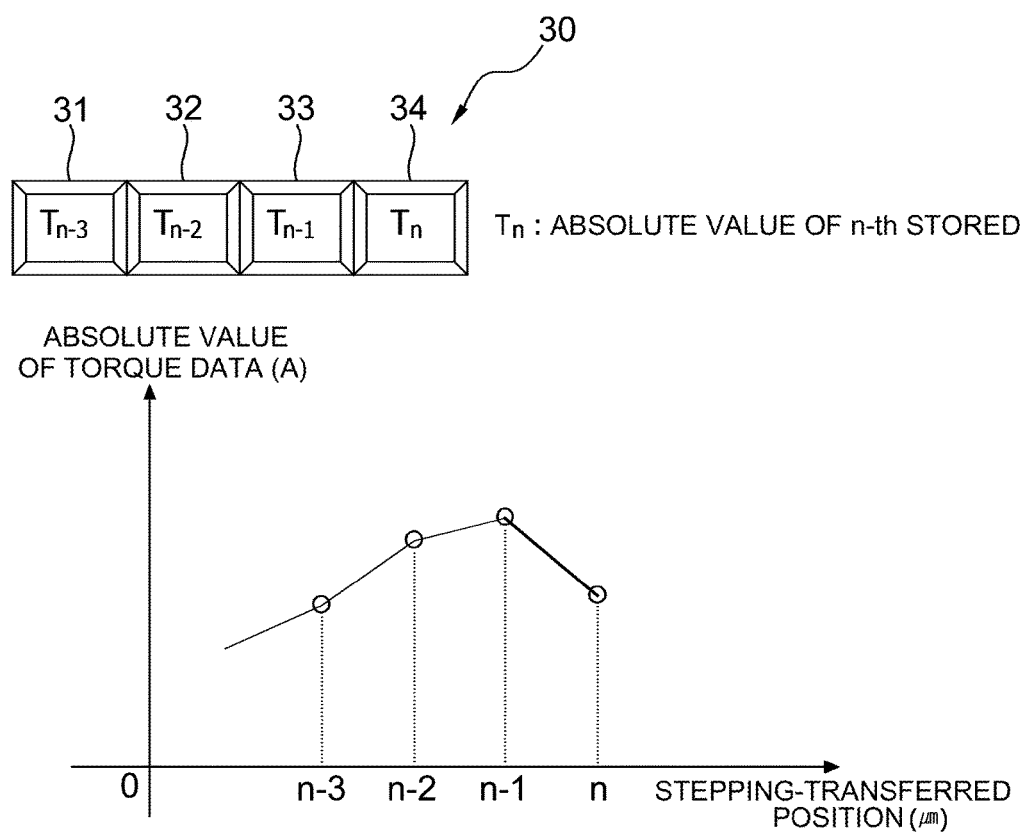
FIG. 4 is a view of a memory buffer for storing torque data, and a graph of a stepping distance in the vicinity of a torque peak and torque recorded in the memory buffer.

Preferably, the torque data of the motor occurring when the output shaft is stepping-transferred in the opposite direction (second direction) after reversing the motor is used. For example, the torque data of the motor is observed while stepping-transferring the output shaft by 1 µm. Here, as illustrated in FIG. 4, it can be seen that in a case where a buffer 30 including four memories 31, 32, 33, and 34 is used, when the stored increase or decrease pattern of the torque data is converted from an increase state to a decrease state, the point represents a peak. That is, when $T_{n-2}$ is equal to or greater than $T_{n-3}$, $T_{n-1}$ is equal to or greater than $T_{n-2}$, and $T_n$ is smaller than $T_{n-1}$, it may be determined that a peak of the torque data is detected at the (n−1)th position, and the (n−1) is the detected backlash amount.

Figure 5:
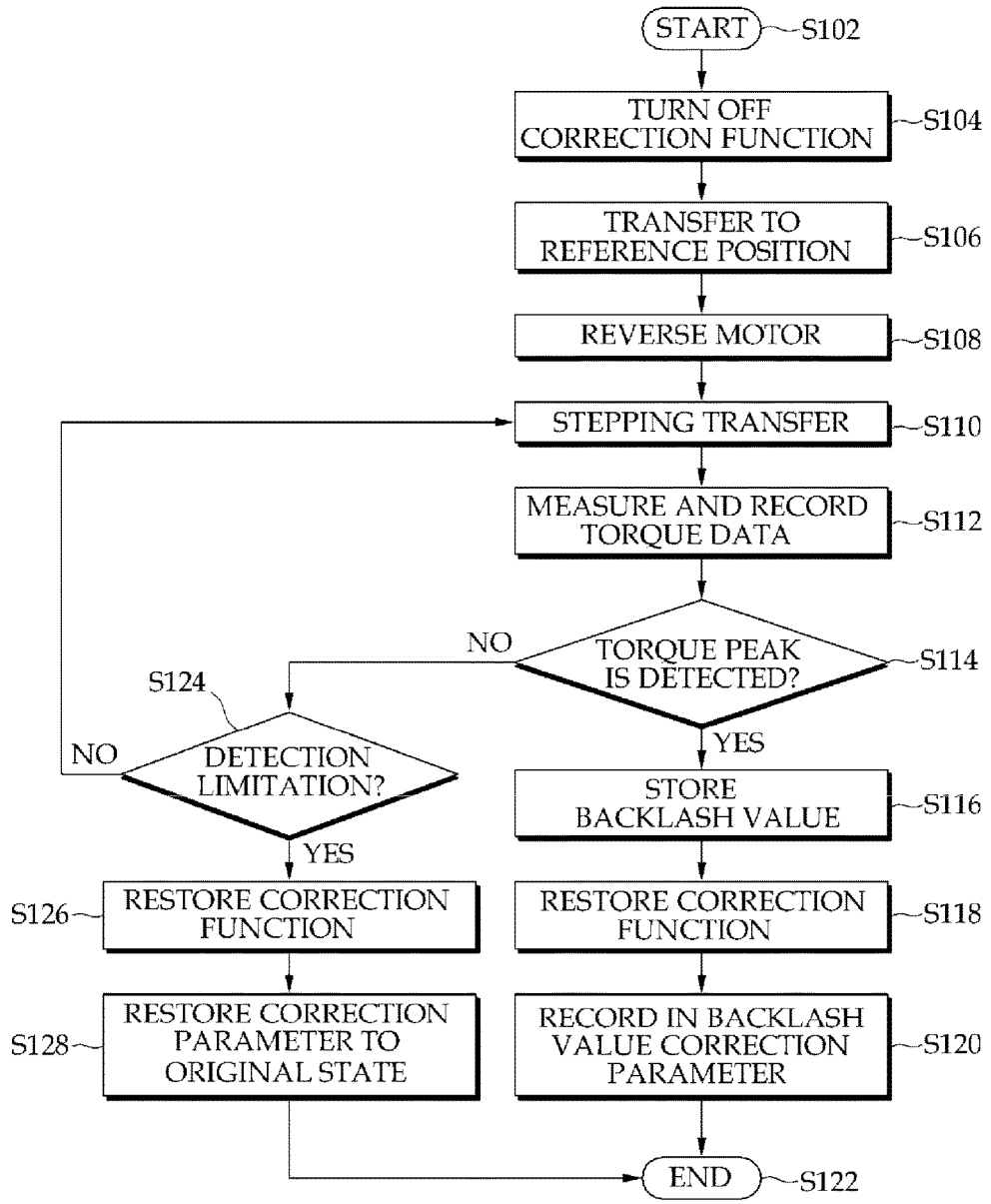
FIG. 5 is a flow chart illustrating a method of detecting a first direction backlash in accordance with the present disclosure.

FIG. 5 is a flow chart of a method of detecting the backlash amount according to the present disclosure. Step S102 is a step of starting a backlash detection function, and a user starts the backlash detection function which is contained in the numerical control (NC) apparatus of the machine tool. For example, the user pushes a backlash detection start button arranged on a corresponding function screen 40 of the numerical control (NC) apparatus, or instructs a corresponding function code (for example, G code) so as to start the backlash detection function. Step S104 is a step of turning off a correction function in relation to the backlash which is basically embedded in the numerical control (NC) apparatus, and preferably, a backlash correction amount parameter is set to be "0", and a backlash acceleration function is turned off. Because the backlash correction amount and the backlash acceleration function, which are stored before as parameters in the numerical control (NC) apparatus, may negatively affect accuracy of the backlash detection function, the functions are preferably turned off. Step S106 is preferably a step of transferring the transfer table 16 to a reference position. A region, where the processing is often performed, is set to be the reference position of the transfer table 6, and the backlash is measured in a state in which the transfer table is transferred to the reference position such that a backlash error occurring when the processing is performed may be maximally reduced. Here, for convenience, a direction in which the transfer table 16 is transferred to the reference position is referred to as a first direction. Step S108 is a step of reversing the servomotor 11 from the first direction to a second direction.

Step S110 is a step of stepping-transferring the output shaft of the servomotor 11 by 1 μm. In Step S112, the torque data at a current position (n) is measured, and an absolute value of the torque data is recorded in the memory buffer. Step S114 is a step of detecting a torque peak. In order to detect the torque peak, it is determined whether the absolute value of the torque data is increased or decreased by comparing the torque data ($T_n$) at the current position (n) with the torque data ($T_{n-1}$) at the previous position (n−1). The absolute value of torque of the servomotor 11 is decreased while the wound up or twisted state of the ball screw 15a and the coupling 12 is released after reversing the motor. The absolute value of torque of the servomotor 11 is increased again until the absolute value thereof reaches a peak after the wound up or twisted state of the ball screw 15a and the coupling 12 is completely released, and a point where the absolute data of the torque data, which is increased, begins to be decreased is the peak. When the absolute value of the torque data of the servomotor 11 is increased, but does not reach a peak of the torque data, the process returns back to Step S110, and the same process is repeated. When the absolute value of the torque data is increased and then decreased, and a peak of the torque data occurs at the (n−1)th position, the process proceeds to Step S116. In Step S116, the position (n−1) detected in Step S114, where the peak of the torque data occurs, is stored in a backlash value storage unit.

Next, Step S118 is a step of restoring the correction function in relation to the backlash which is basically embedded in the numerical control (NC) apparatus, and preferably, the backlash acceleration function is restored to an original state. Next, in Step S120, the detected backlash value stored in the backlash value storage unit is recorded in the backlash correction amount parameter. In Step S122, the backlash detection process ends.

Preferably, when the torque peak is not detected even after Step S110 (stepping step) and Step S114 (torque peak detection step) are repeated by the predetermined number of times or more, it is determined that in Step S124, a detection limitation is exceeded, the backlash acceleration function is restored to the original state (Step S126), the backlash correction amount parameter is restored to the original state (Step S128), and then the process ends. At this time, preferably, a message informing that the detection limitation is exceeded may be displayed on the screen of the numerical control (NC) apparatus.

Figure 6:
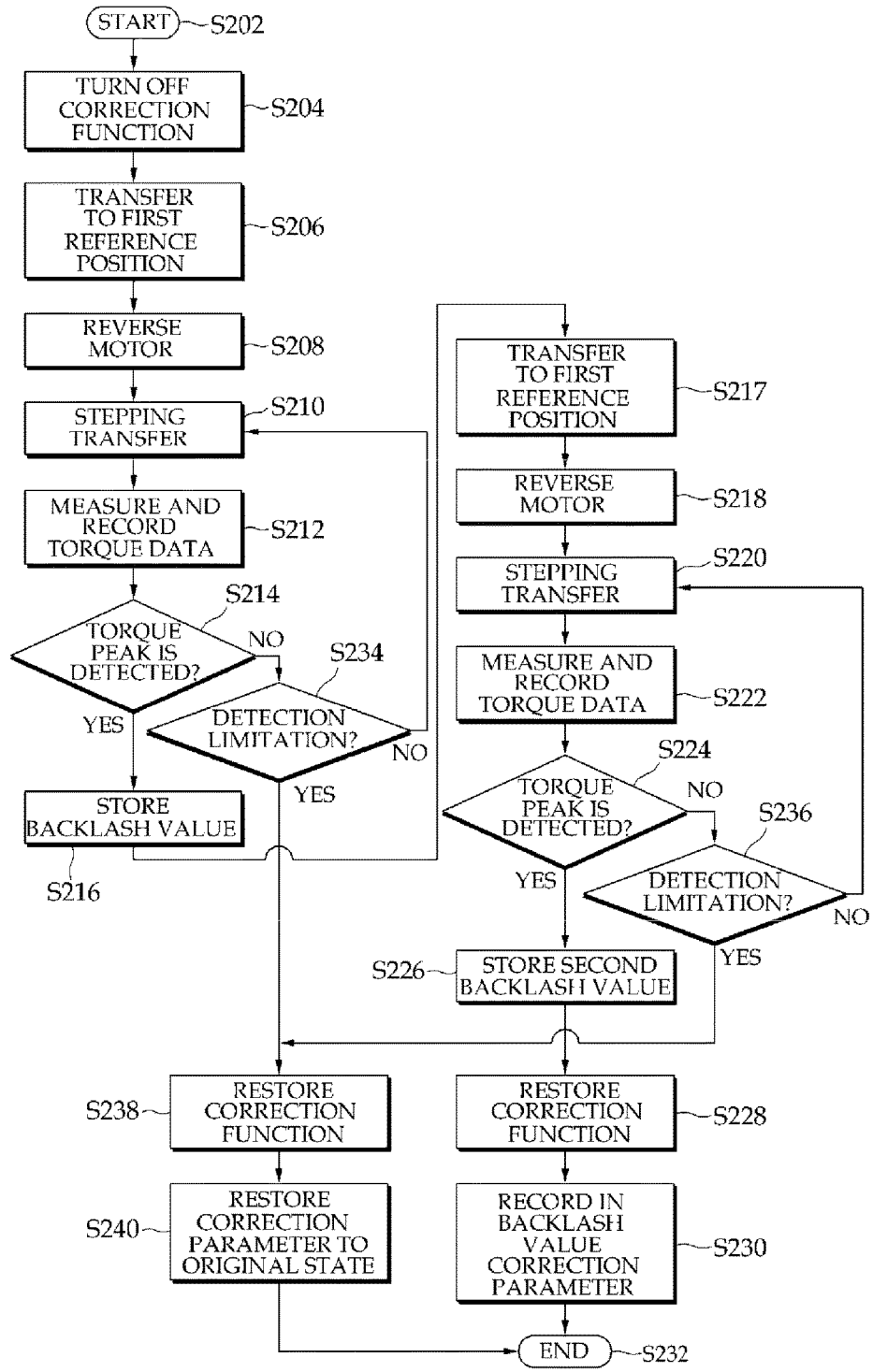
FIG. 6 is a flow chart illustrating a method of detecting a bi-directional backlash in accordance with the present disclosure.

FIG. 6 illustrates a method of detecting the backlash amount two times in both directions in accordance with the present disclosure. The backlash amount detection method is the same as the method illustrated in FIG. 5, and the difference is in that the backlash is detected once using the method as illustrated in FIG. 5, and then a similar backlash detection step is further repeated once in order to detect the backlash in the opposite direction again.

In detail, Step S202 is a step of starting backlash detection, and the user starts the backlash detection function which is contained in the numerical control (NC) apparatus of the machine tool. Step S204 is a step of turning off the correction function, and preferably, the backlash correction amount parameter is set to be "0", and the backlash acceleration function is turned off. Step S206 is a step of transferring the transfer table 16 to a first reference position. Here, for convenience, a direction in which the transfer table 16 is transferred to the reference position is referred to as the first direction. Step S208 is a step of reversing the servomotor 11 from the first direction to the second direction.

Step S210 is a step of stepping-transferring the output shaft of the servomotor 11 by 1 μm. In Step S212, the torque date is measured and recorded. Step S214 is a step of detecting a torque peak. In order to detect the torque peak, it is determined whether the absolute value of the torque data is increased or decreased by comparing the torque data ($T_n$) at the current position with the torque data ($T_{n-1}$) at the previous position. The absolute value of torque of the servomotor 11 is decreased while the wound up or twisted state of the ball screw 15a and the coupling 12 is released after reversing the motor. The absolute value of torque of the servomotor 11 is increased again until the absolute value thereof reaches a peak after the wound up or twisted state of the ball screw 15a and the coupling 12 is completely released, and a point where the absolute value of the torque data, which is increased, begins to be decreased is the peak. When the absolute value of the torque data of the servomotor 11 is increased, but does not reach a peak of the torque data, the process returns back to Step S210, and the same process is repeated. When the absolute value of the torque data is increased and then decreased, and a peak of the torque data occurs at the (n−1)th position, the process proceeds to next Step S216. In Step S216, the position (n−1) detected in Step S214, where the peak of the torque data occurs, is stored in a first backlash value storage unit.

Next, Step S217 is a step of transferring the transfer table 16 to a second reference position. In Step S218, the servomotor 11 is reversed again from the second direction to the first direction. Step S220 is a step of stepping-transferring the output shaft of the servomotor 11 by 1 μm. In Step 222, the torque data is measured and recorded. Step 224 is a step of detecting the torque peak. In order to detect the torque peak, it is determined whether the absolute value of the torque data is increased or decreased by comparing the torque data ($T_n$) at the current position with the torque data ($T_{n-1}$) at the previous position. The absolute value of torque of the servomotor 11 is decreased while the wound up or twisted state of the ball screw 15a and the coupling 12 is released after reversing the motor. The absolute value of torque of the servomotor 11 is increased again until the absolute value thereof reaches a peak after the wound up or twisted state of the ball screw 15a and the coupling 12 is completely released, and a point where the absolute of the torque data, which is increased, begins to be decreased is the peak. When the absolute value of the torque data of the servomotor 11 is increased, but does not reach a peak of the torque data, the process returns back to Step S220, and the same process is repeated. When the absolute value of the torque data is increased and then decreased, and a peak of the torque data occurs at the (n−1)th position, the process proceeds to next Step S226. In Step S226, the position (n−1) detected in Step S224, where the peak of the torque data occurs, is stored in a second backlash value storage unit.

Step 228 is a step of restoring functions, and preferably, the backlash acceleration function and the like are restored. Step 230 is a step of calculating an average value of the first backlash value stored in the first backlash value storage unit and the second backlash value stored in the second backlash value storage unit, and storing the average value in the backlash correction parameter. In Step S232, the backlash detection process ends Preferably, when the torque peak is not detected even after Step S210 (stepping step) and Step S214 (peak detection step), or Step S220 (stepping step) and Step S224 (peak detection step) are repeated by the predetermined number of times or more, it is determined that in Step S234 or Step S236, a detection limitation is exceeded, the backlash acceleration function is restored to the original state (Step S238), the backlash correction amount parameter is restored to the original state (Step S240), and then the process ends (Step S232). At this time, preferably, a message informing that the detection limitation is exceeded may be displayed on the screen of the numerical control (NC) apparatus.

Figure 7:
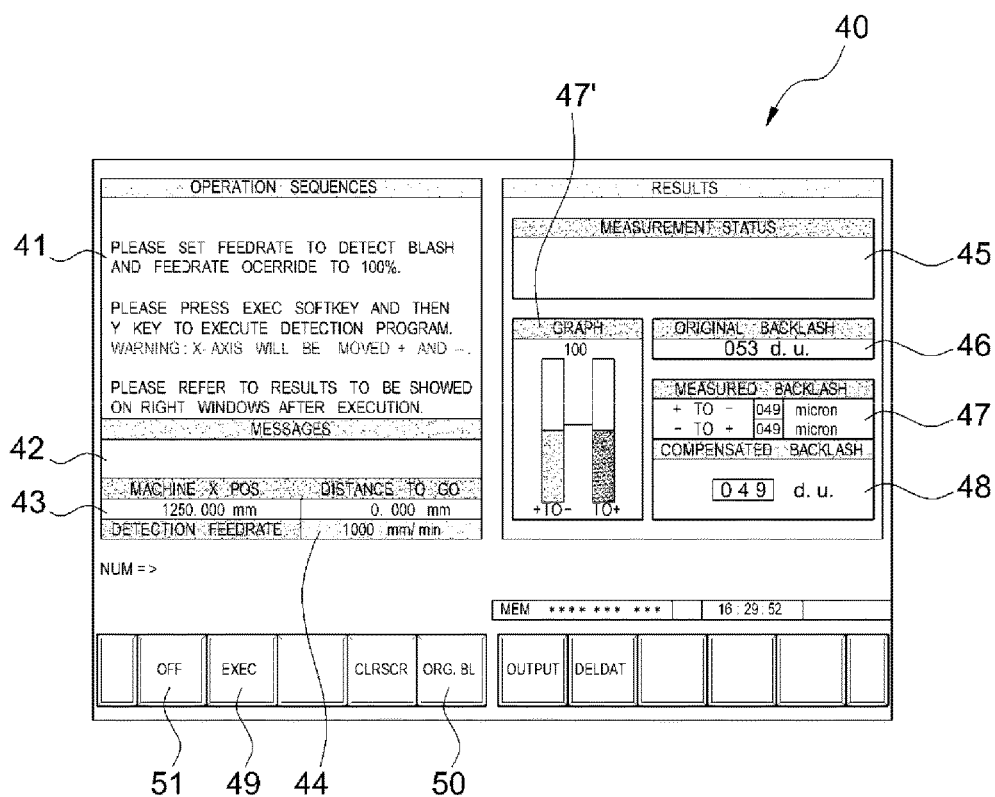
FIG. 7 is a diagram illustrating a screen of a numerical control (NC) apparatus in which a backlash detection function according to the present disclosure is implemented.

FIG. 7 illustrates the screen 40 of the numerical control (NC) apparatus in which the backlash measurement method according to the present disclosure is implemented. The NC screen 40 may include an explaining unit 41 which explains a procedure for using functions, a message unit 42 which displays a warning content and the like occurring when the functions are used, a distance display unit 43 which displays a current position and the remaining transfer distance of the output shaft 11a of the servomotor 11, a speed display unit 44 which sets and displays a backlash measurement speed, a state display unit 45 which displays the procedure that is currently performed when the backlash is measured, an existing backlash display unit 46 which displays an existing/original backlash correction value of equipment, a measurement backlash display unit 47 which displays the respective backlash amounts that are measured when the motor is reversed from (+) direction to (−) direction and from (−) direction to (+) direction, a measurement backlash graph unit 47' which displays the measured backlash amount as a graph, an average backlash display unit 48 which displays a correction amount recorded in the backlash correction parameter by calculating an average of the measured bi-directional backlashes, a start button 49 for starting the backlash measurement and correction functions, an original state restoring button 50 which records the existing backlash correction value of the equipment to an NC parameter, and an on/off button 51 for turning on/off an application of automatic backlash measurement and correction functions.

(Test Results)

The result of testing the NC machine tool to which the automatic backlash measurement function according to the present disclosure is applied is as follows.

1. The result of testing five times the machine tool Model No. DBC130 313 (1 to 3 decelerator) of the applicant by applying the functions thereto in a non-load state is as follows.

Actual backlash amount that is measured by a laser measurement instrument and stored as an NC correction parameter: 53 µm Backlash amount detected by repeating the tests five times: 55, 47, 49, 49, and 48 (average 50 µm)

Accuracy: 94.34%

2. The result of testing five times the machine tool Model No. DBC130 315 (1 to 3 decelerator) of the applicant by applying the functions thereto in a non-load state is as follows.

Actual backlash amount that is measured by a laser measurement instrument and stored as an NC correction parameter: 36 µm Backlash amount detected by repeating the tests five times: 32, 33, 34, 31, and 34 (average 33 µm)

Accuracy: 91.67%

3. The result of testing twice the machine tool Model No. DBC250 63 (direct driving type) of the applicant by applying the functions thereto in a state where a material of 15 tons is seated thereon is as follows.

Actual backlash amount detected by a capacitance sensor: 60 µm

Backlash amount detected by repeating tests two times: 54, and 50 (average 52 µm)

Accuracy: 86.67%

Since the method of detecting a backlash according to the present disclosure uses additional functions added to the existing numerical control (NC) apparatus, as can be seen from the aforementioned test results, the backlash may be detected with sufficiently high accuracy without adding additional equipment.

The present disclosure is available for various types of machines, apparatuses, equipment, facilities or the like, such as a machine tool, which has a transfer system.

Although the present disclosure has been described with reference to exemplary and preferred embodiments, workers skilled in the art will recognize that changes may be made in form and detail without departing from the spirit and scope of the disclosure.

The invention claimed is:

1. A method of detecting a backlash which occurs by reversing a motor of a transfer system of a numerical control machine tool, the method comprising:
   turning off a backlash acceleration function of the numerical control machine tool and setting a backlash correction amount parameter to be zero;
   transferring a transfer table of the transfer system to a reference position;
   reversing a servomotor;
   measuring a torque variation of the servomotor of the transfer system;
   recording the torque variation of the servomotor in a memory buffer;
   detecting a torque peak in which an absolute value of torque is placed at a peak based on the recorded torque variation of the servomotor;
   determining a backlash value by calculating a distance that an output shaft of the servomotor is transferred at the detected torque peak;

turning on the backlash acceleration function of the numerical control machine tool; and recording the determined backlash value in the backlash correction amount parameter of the numerical control machine tool, wherein the measuring and recording of the torque variation of the servomotor includes transferring an output shaft of the servomotor at a slower speed after reversing the motor than before reversing the motor, and measuring and recording torque of the servomotor at each position where the output shaft thereof is transferred, and the detecting of the torque peak in which the absolute value of the torque is placed at the peak by observing the torque variation of the servomotor includes detecting a peak by comparing an absolute value of torque at each position where the output shaft is transferred with an absolute value of torque at a previous position, and wherein the determining a backlash value by calculating a distance that an output shaft of the servomotor is transferred at the detected torque peak includes determining a backlash value as the distance moved by the servomotor from a point where an inversion of the servomotor starts to a peak of the torque at which the absolute value of the torque of the servomotor is at a peak.

2. The method of claim 1, further comprising:
detecting once more the backlash value in the opposite direction to a direction in which the backlash value is detected.

3. A numerical control apparatus having a backlash detection function configured to detect a backlash which occurs by reversing a motor of a transfer system of a numerical control machine tool, the apparatus comprising:

a memory buffer configured to record a torque variation of a servomotor, wherein the numerical control apparatus is programmed to detect a torque peak in which an absolute value of torque is placed at a peak by observing the torque variation recorded in the memory buffer, and programmed to determine a backlash value by calculating a distance that an output shaft of the servomotor is transferred at the torque peak, wherein the numerical control apparatus is programmed to transfer the output shaft of the servomotor at a slower speed after reversing the motor than before reversing the motor, measure torque of the servomotor at each position where the output shaft thereof is transferred, and record the measured torque in the memory buffer, the memory buffer is configured to record an absolute value of torque of the servomotor at each position where the output shaft thereof is transferred, and the numerical control apparatus is programmed to detect the torque peak by comparing an absolute value of torque at each position where the output shaft thereof is transferred with an absolute value of torque at a previous position, and wherein the numerical control apparatus is configured to determine a backlash value as the distance moved by the servomotor from a point where an inversion of the servomotor starts to a peak of the torque at which the absolute value of the torque of the servomotor is at a peak;

wherein the numerical control apparatus is further programmed to, before recording the torque variation of the servomotor:
turn off a backlash acceleration function of the numerical control machine tool;
set a backlash correction amount parameter to be zero;
transfer a transfer table of the transfer system to a reference position; and
reverse the servomotor; and wherein the numerical control apparatus is further programmed to, after the determining of the backlash value:
turn on the backlash acceleration function of the numerical control machine tool; and
record the determined backlash value in the backlash correction amount parameter of the numerical control machine tool.

4. The numerical control apparatus of claim 3, further comprising:
a correction parameter storage unit configured to store the backlash correction amount parameter, wherein the numerical control apparatus is programmed to record the determined backlash value in the correction parameter storage unit.

5. The numerical control apparatus of claim 3, wherein the numerical control apparatus is programmed to detect once more the backlash value in the opposite direction to a direction in which the backlash value is detected.

* * * * *